United States Patent [19]
Elkin et al.

[11] Patent Number: 5,966,656
[45] Date of Patent: Oct. 12, 1999

[54] METHOD AND APPARATUS FOR DISPLAYING SIGNAL INFORMATION IN A RADIO COMMUNICATION DEVICE

[75] Inventors: Kenneth Charles Elkin, Lake Worth; Gregory O. Snowden, Boca Raton, both of Fla.

[73] Assignee: Motorola, Inc., Schaumburg, Ill.

[21] Appl. No.: 08/815,500

[22] Filed: Mar. 11, 1997

[51] Int. Cl.⁶ ................................................... H04Q 7/32
[52] U.S. Cl. .......................... 455/421; 455/226.1; 455/229
[58] Field of Search ................... 455/226.1, 421, 455/226.2, 226.3, 226.4, 231, 242.2, 277.2, 344, 67.1, 229, 414, 422, 432, 436, 67.7

[56] References Cited

U.S. PATENT DOCUMENTS

| | | | |
|---|---|---|---|
| 5,128,938 | 7/1992 | Borras | 455/343 |
| 5,193,216 | 3/1993 | Davis | 455/67.7 |
| 5,309,500 | 5/1994 | Koma et al. | 455/550 |
| 5,363,377 | 11/1994 | Sharpe | 455/502 |
| 5,490,201 | 2/1996 | Moberg et al. | 455/433 |
| 5,579,535 | 11/1996 | Orlen et al. | 455/421 |
| 5,659,596 | 8/1997 | Dunn | 455/456 |
| 5,722,068 | 2/1998 | Bartle et al. | 455/421 |
| 5,809,414 | 9/1998 | Coverdale et al. | 455/421 |
| 5,847,657 | 12/1998 | Tsuchiyama | 455/421 |

*Primary Examiner*—Dwayne D. Bost
*Assistant Examiner*—Jean A. Gelin
*Attorney, Agent, or Firm*—Keith A. Chanroo

[57] ABSTRACT

A radio communication device (100) for displaying information about a signal includes a display (120) for presenting the information. A measurer (110) measures signal quality of the signal received by the radio communication device (100), and an entry element (145) determines from the signal quality whether the radio communication device (100) is out of range. The entry element (145) then stores times of out-of-range conditions in a history table (130). A report element (150) can be activated to drive the display (120) for presentation of the times of the out-of-range conditions. The report element (150) can, for instance, be activated by the user, at periodic times, at specified times, or in response to specific events.

20 Claims, 2 Drawing Sheets

METHOD AND APPARATUS FOR DISPLAYING SIGNAL INFORMATION IN A RADIO COMMUNICATION DEVICE

FIELD OF THE INVENTION

This invention relates in general to radio communications, and more specifically to a radio communication device for displaying signal information to a user.

BACKGROUND OF THE INVENTION

Conventional radio communication systems include one or more transmitting devices for transmitting messages throughout different geographic regions and portable radio communication devices for receiving the messages. In this manner, a user can carry a radio communication device, such as a pager or cellular phone, to remain accessible even when away from the home or office. However, messages intended for a particular radio communication device do not always reach the device because it may be out of range of the transmitting device. The radio communication device could be, for instance, outside the geographic region serviced by the transmitting device, in a fringe area, or in a region where radio communications are blocked. Furthermore, the user is often not aware that a message has been missed, so he does not know to request retransmission of missed messages.

Thus, what is needed is a way to inform the user of the possibility of missed messages.

DESCRIPTION OF A PREFERRED EMBODIMENT

Figure 1:
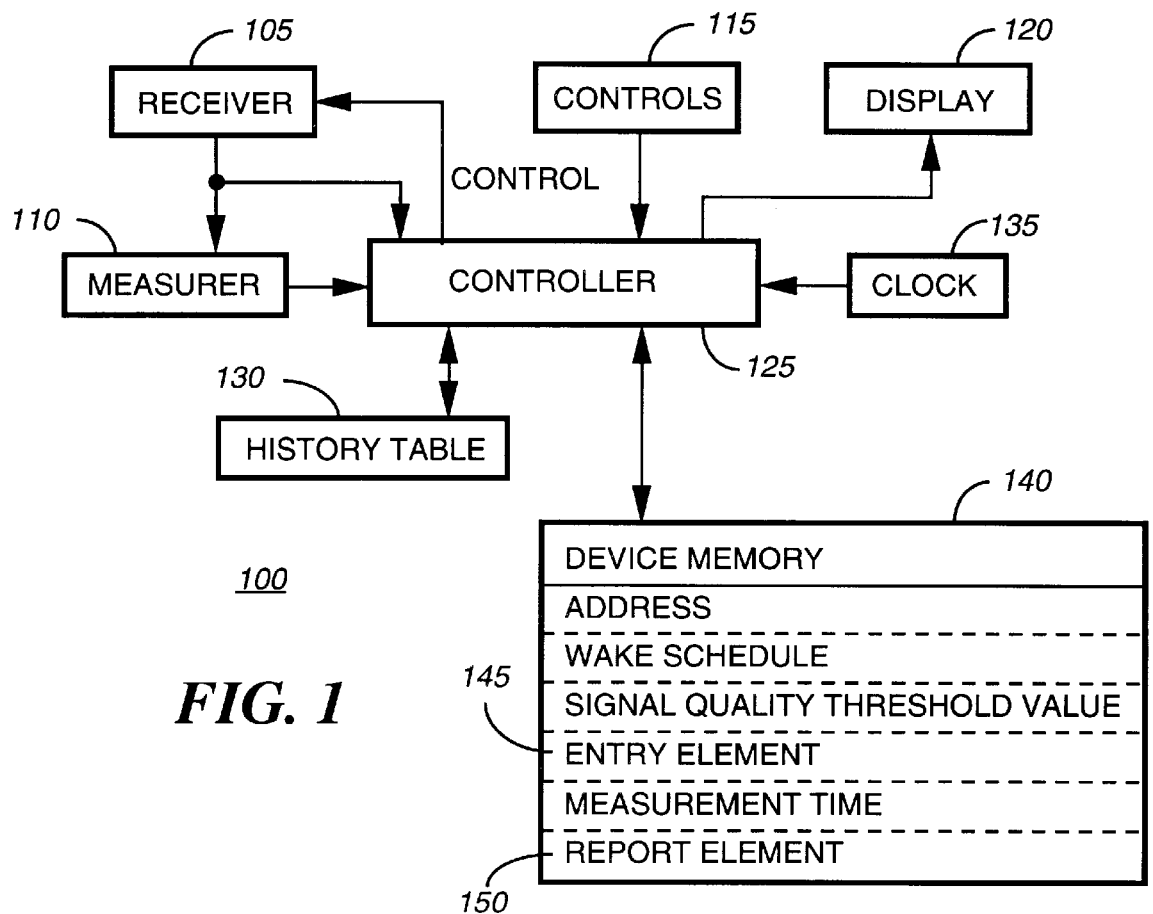
FIG. 1 is an electrical block diagram of a radio communication device for informing the user of the possibility of missed messages according to the present invention.

FIG. 1 is an electrical block diagram of a radio communication device 100, such as a wireless data receiver, pager, or cellular phone, in accordance with the present invention. The radio communication device 100 comprises a receiver 105 for receiving and demodulating a radio signal from a transmitting device (not shown) when the radio communication device 100 is within range of the transmitting device. The radio communication device 100 also includes a controller 125 for processing the radio signal and controlling activation of the receiver 105. A measurer 110 coupled to the receiver 105 performs conventional signal quality measurements on the received signal. Preferably, the measurer 110 measures signal strength; however, alternative measurements could be made, such as measurements of bit error rate or signal-to-noise ratio.

A clock 135 included in the radio communication device 100 provides time values to the controller 125, controls 115 provide user-initiated commands, and a display 120 is driven by the controller 125 to present information to a user of the radio communication device 100. A device memory 140 is coupled to the controller 125 for storing operational parameters and subroutines. For example, the device memory 140 stores an address associated with the radio communication device 100 and a wake schedule indicative of conventional battery saving operations in which the receiver 105 is activated during specified awake times to receive messages and deactivated during other times when messages are not expected to be transmitted.

An entry element 145 is included in the radio communication device 100 for determining whether the radio communication device 100 is out of range of message transmitting devices during the receiver awake times. This can be done in a variety of ways, such as by comparing the signal quality of the received radio signal with a stored signal quality threshold value and determining that an out-of-range condition exists when the quality of the received signal is less than the threshold value, which can be programmable and should be set to a value below which communications are unlikely to be received correctly. As mentioned, measurement of signal strength and comparison with a signal strength threshold value is one method of determining whether an out-of-range condition exists.

Preferably, the determination of whether the device 100 is out of range is made upon activation of the receiver 105 and at periodic times thereafter, such as at times indicated by a programmable measurement time stored in the device memory 140. The measurement time could indicate, for instance, that the out-of-range determination be made every thirty seconds or every minute during receiver awake times. According to the present invention, the entry element 145 further records the dates and times of out-of-range conditions in a history table 130 coupled to the controller 125.

The determination of whether the device 100 is out of range should be made with some degree of reliability. Therefore, it is also preferred, although not required, that the entry element 145 sample the signal quality measurement provided by the measurer 110 according to a programmed algorithm prior to making a determination. By way of example, the signal quality measurement provided by the measurer 110 could be sampled several times per second for several seconds, after which the samples could be averaged prior to comparing the average value with the threshold value. In this manner, momentary aberrations in the quality measurement will not affect the performance of the entry element 145. The algorithm according to which the entry element 145 operates can be stored in the device memory 140.

The radio communication device 100 also includes a report element 150 for reporting out-of-range conditions to the user, preferably in the form of an out-of-range history report generated from the dates and times stored in the history table 130 and presented on the display 120.

Figure 2:
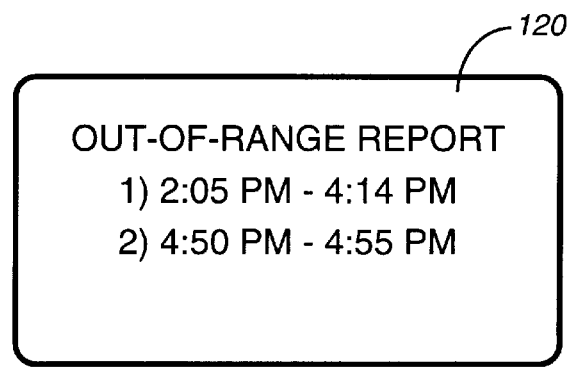
FIG. 2 is an illustration of coverage information presented on a display of the radio communication device of FIG. 1 according to the present invention.

An example of an out-of-range history report is illustrated in FIG. 2. As shown, the history report can indicate the time periods during which the receiver 105 was activated for reception but incapable of correctly receiving messages. To prevent confusion, the history report preferably only indicates out-of-range time periods that exceed a certain minimum time period, e.g., one minute, so that very small periods of time during which the device 100 was out of range are not presented. When, for instance, the device 100 is moved out of range but almost immediately moves in range again, the likelihood of missing a message is slim, and alerting a user is probably unnecessary. However, it will be understood that, if desired, every out-of-range condition, regardless of duration, can be presented to the user in the history report.

The history report can be generated in response to a variety of conditions. For instance, the report can be presented in response to reception of a user-initiated command, such as a "report" command received from the user-activated controls 115, or in response to passage of a particular amount of time, such as one hour, from the last report. Presentation of the report could also be triggered by expiration of a period of time, e.g., five minutes, during which the radio communication device 100 was out of range, occurrence of specified times, or occurrence of specified events, e.g., powering up the radio communication device 100 or determining that the device 100 is in range after a period during which it was out of range.

It will be appreciated that any type of report that tracks out-of-range conditions for the user can be used. For example, an "in-range" history report could instead be presented to inform the user of time periods during which the radio communication device 100 was in range. Alternatively, a "total" history report could be presented to inform the user of out-of-range periods, in-range periods, and even marginal periods. Other formats for the history report could also be used to indicate to the user the times during which messages could have been missed.

The entry element 145 and the report element 150 are preferably firmware elements stored in the device memory 140 and executed by the controller 125 during operation of the radio communication device 100. Alternatively, the entry element 145 and the report element 150 could be implemented in hardware capable of performing equivalent operations.

According to the present invention, the radio communication device 100 conveniently stores the dates and times of out-of-range conditions, then presents the user with an out-of-range history report to alert the user of the out-of-range conditions. As a result, the user is informed of the possibility of missed messages so that he can request, such as by telephone, retransmission of any messages that were transmitted during the times when the radio communication device 100 was out of range of the transmitting device. Missed messages can then be retransmitted to the device 100, thereby ensuring that the user receives all of his messages. Alternatively, missed messages could be provided to the user via another path, such as over the telephone or by electronic mail.

In prior art devices, on the other hand, wireless devices in a one-way communication system do not track out-of-range conditions to provide a history report that alerts the user to the possibility of missed messages. Therefore, conventional wireless devices do not provide the reliability of the radio communication device 100 according to the present invention.

Figure 3:
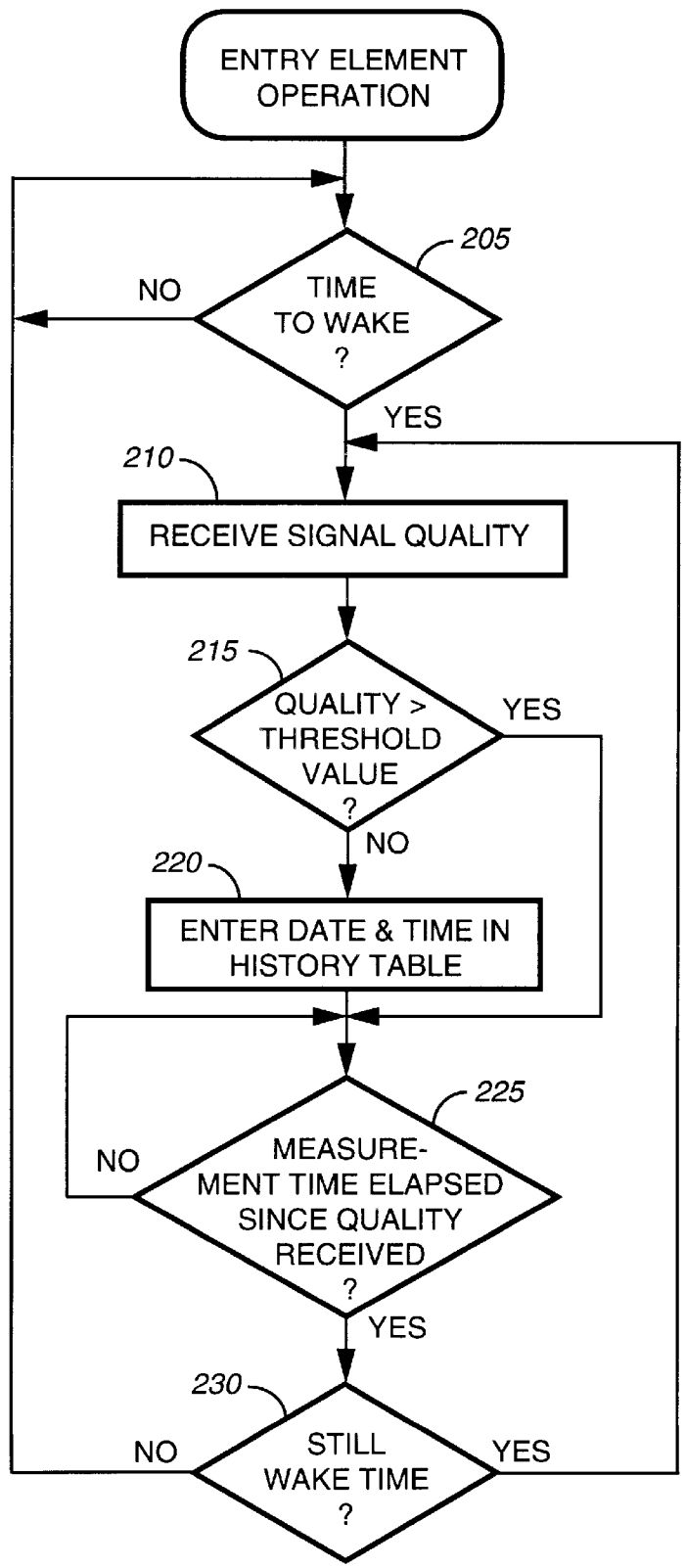
FIG. 3 is a flowchart of an operation of an entry element included in the radio communication device of FIG. 1 according to the present invention.

Referring next to FIG. 3, a flowchart of an operation of the entry element 145 is shown. When, at step 205, the wake schedule indicates that it is time for the receiver 105 to be activated by the controller 125, the entry element 145 receives, at step 210, a measurement of signal quality from the controller 125 and determines, at step 215, whether the received signal quality indicates that the device 100 is out of range of transmitting devices. This can be done, for instance, by comparing the received signal quality to the programmed signal quality threshold value and determining that the device 100 is out of range when the threshold value exceeds the received signal quality measurement. It will be understood that alternative methods can also be used to determine whether the radio communication device 100 is out of range of radio transmissions.

When, at step 215, the radio communication device 100 is out of range, the entry element 145 enters, at step 220, the time and date of the out-of-range condition in the history table 130. After the out-of-range determination at step 215, the entry element 145 determines, at step 225, whether the programmed measurement time has elapsed since reception of the signal quality measurement at step 210. When, at step 225, the measurement time and the time values from the clock 135 (FIG. 1) indicate that it is again time to make an out-of-range determination, and when, at step 230, the receiver 105 is still activated during an awake time, the signal quality measurement is again received, at step 210. Processing by the entry element 145 continues to periodically determine whether the device 100 is out of range until the receiver 105 is deactivated for battery saving. When the radio communication device 100 comprises a wireless device that does not employ battery saving techniques, it is preferable for the entry element 145 to continually determine whether the device 100 is out of range.

In summary, the radio communication device described above periodically determines whether it is in range of a transmitter that transmits its messages. When the radio communication device is out of range, the time and date of the out-of-range condition are stored in a history table, from which an out-of range history report is generated and presented to the user in response to some predefined criteria. For example, the user can press a button to request a history report, or a history report could be generated automatically without user intervention, such as at a specified time or in response to occurrence of a specified event. In this manner, the user of the radio communication device is advantageously presented with tracking information that details coverage information and times by which the user can determine the possibility of missed messages. The user can then advantageously request access, such as by retransmission or other means, to only those messages that are likely to have been missed. The radio communication device according to the present invention is therefore particularly useful in one-way radio communication systems in which user participation can be necessary for initiation of the message retransmission process.

Conventionally, on the other hand, the user can be presented with an out-of-range icon, but out-of-range conditions are not tracked to generate a history report. The user is therefore unaware of times during which his portable wireless device was out of range. As a result, messages can be missed by a conventional wireless device, and the user probably never knows of the missed messages. The prior art devices are therefore less reliable than the radio communication device according to the present invention.

It will be appreciated by now that there has been provided a method and apparatus for presenting signal coverage information to a user of a radio communication device.

What is claimed is:

1. A radio communication device for displaying information about a signal, the radio communication device comprising:

a display that displays the information;

a measurer that measures signal quality of the signal;

an entry element, coupled to the measurer, that determines from the signal quality whether the radio communication device is out of range and that stores times of out-of-range conditions; and a report element, coupled to the display and the entry element, that drives the display for presentation of the times of the out-of-range conditions.

2. The radio communication device of claim 1, further comprising:

a history table coupled to the entry element for storing the times.

3. The radio communication device of claim 1, further comprising:

a device memory that stores a signal quality threshold value used by the entry element in determining whether the radio communication device is out of range.

4. The radio communication device of claim 3, wherein the signal quality threshold value comprises a signal strength threshold value, and wherein the measurer measures signal strength of the signal.

5. The radio communication device of claim 3, wherein a determination by the entry element of whether the radio communication device is out of range is made after sampling measurements of the signal quality and in accordance with an algorithm stored in the device memory.

6. The radio communication device of claim 1, further comprising:

a receiver that receives the signal; and a device memory, coupled to the receiver, that stores a wake schedule indicative of awake times during which the receiver is activated to receive the signal and that further stores a measurement time, wherein the entry element determines, during the awake times, whether the radio communication device is out of range at intervals indicated by the measurement time.

7. The radio communication device of claim 1, further comprising:

controls for receiving user-initiated commands, wherein the report element causes presentation of the times of the out-of-range conditions in response to reception of a report command from the controls.

8. The radio communication device of claim 1, further comprising:

a controller that is coupled to the display, the measurer, the entry element, and the report element and that controls operations of the radio communication device; and a clock that provides time values to the controller, wherein the controller controls activation of a receiver according to a wake schedule.

9. The radio communication device of claim 8, wherein the wake schedule indicates frames of the signal in which the radio communication device is to awake.

10. A radio communication device for storing information about a signal, the radio communication device comprising:

a receiver that receives the signal;

a display that displays the information;

a measurer, coupled to the receiver, that measures signal quality of the signal;

an entry element, coupled to the measurer, that determines whether the signal quality is less than a threshold value, indicating that the radio communication device is out of range, in response to which times of out-of-range conditions are stored; and a history table, coupled to the entry element, that stores the times of the out-of-range conditions.

11. The radio communication device of claim 10, further comprising:

a report element, coupled to the display, that drives the display for presentation of the times of the out-of-range conditions in response to reception of a user-initiated command.

12. The radio communication device of claim 10, further comprising:

a report element, coupled to the display, that drives the display for presentation of the times of the out-of-range conditions at specified times.

13. The radio communication device of claim 10, further comprising:

a report element, coupled to the display, that drives the display for presentation of the times of the out-of-range conditions in response to occurrence of specified events.

14. A method for processing information about a signal received by a radio communication device, the method comprising the steps of:

measuring signal quality of the signal;

determining from the signal quality whether the radio communication device is out of range;

storing times of out-of-range conditions in a history table; and presenting the times of the out-of-range conditions on a display.

15. The method of claim 14, wherein the determining step comprises the step of determining that the radio communication device is out of range when the signal quality is less than a threshold value.

16. The method of claim 14, wherein the presenting step occurs in response to receiving a user-initiated command.

17. The method of claim 14, wherein the presenting step occurs in response to determining that a specified event has occurred.

18. The method of claim 14, wherein the presenting step occurs in response to determining that a specified time has arrived.

19. The method of claim 14, further comprising, prior to the measuring step, the step of activating a receiver to receive the signal at awake times indicated by wake schedule stored by the radio communication device.

20. The method of claim 19, further comprising the step of storing a measurement time in a device memory, wherein the determining step comprises the step of determining, during the awake times, whether the radio communication device is out of range at intervals indicated by the measurement time.

* * * * *